UNITED STATES PATENT OFFICE.

CHARLES M. REQUA, OF NEW YORK, N. Y., ASSIGNOR OF ONE-THIRD TO C. H. HUMPHREYS, OF CINCINNATI, OHIO.

COMPOSITION OF MATTER FOR MARKING PENCILS OR CRAYONS.

SPECIFICATION forming part of Letters Patent No. 394,937, dated December 18, 1888.

Application filed December 1, 1887. Serial No. 256,582. (No specimens.)

*To all whom it may concern:*

Be it known that I, CHARLES M. REQUA, of the city of New York, county of New York, and State of New York, have invented an Improved and Useful Composition of Matter for Marking Pencils or Crayons, of which the following is a description.

The object of this invention is to provide a composition from which to make cheap and good pencils or crayons, intended more particularly for marking boxes or packages of merchandise.

In carrying out the invention I take of paraffine seven pounds, beeswax one pound, and resin one pound, and melt them and mix them together thoroughly, and add a suitable coloring-matter—lamp-black, for instance—to the extent of one pound if the pencils or crayons are to have a black color; but any other coloring-matter may be used, depending on the preferred color of the pencils or crayons. After the coloring-matter is thoroughly incorporated into the mass by any mixing process the composition will be poured into molds of any suitable size and form to shape the pencils or crayons, which, when hardened by cooling in the molds, may be removed therefrom, ready for immediate use.

The paraffine and beeswax give consistency and cohesiveness, and the resin imparts sufficient hardness short of brittleness to give the pencils or crayons the necessary stiffness and improve their marking qualities.

The above-named proportions give good results; but I am not limited to the exact quantities of the ingredients specified, as there may be some variation within the scope of my invention.

These pencils or crayons have properties which peculiarly fit them for use in marking rough or smooth surfaces of boxes or packages—that is to say, the pencils have requisite hardness to assure a clear and quite indelible mark, and yet possess sufficient strength to allow them to be thrown about carelessly with little or no danger of breaking them, and they are practically waterproof and will not stain the fingers when in use.

Having thus fully described my invention, I claim as new and desire to secure by Letters Patent—

The herein-described composition of matter to be used for pencils or crayons, and consisting of paraffine, beeswax, and resin, and a coloring-matter, combined substantially in the manner set forth.

CHARLES M. REQUA.

Witnesses:
  WILLIAM H. NOAH,
  MARK BLOOMINGDALE.